(12) United States Patent  (10) Patent No.: US 7,959,322 B2
Smith  (45) Date of Patent: Jun. 14, 2011

(54) OPTICAL SYSTEM FOR LED ARRAY

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 224 days.

(21) Appl. No.: 12/386,927

(22) Filed: Apr. 24, 2009

(65) Prior Publication Data

US 2010/0271818 A1  Oct. 28, 2010

(51) Int. Cl.
*F21V 1/00* (2006.01)
*F21V 11/00* (2006.01)

(52) U.S. Cl. ....... 362/235; 362/97.3; 362/219; 362/223; 362/245

(58) Field of Classification Search ................ 362/97.1, 362/97.2, 97.3, 217.01, 217.02, 217.05, 217.06, 362/217.07, 219, 222, 223, 225, 230, 235, 362/236, 240, 241, 245, 247, 249.01, 249.02, 362/249.06, 296.01, 296.07, 326, 327, 334, 362/336, 346, 347, 518, 545, 800; 349/57–62
See application file for complete search history.

(56) References Cited

U.S. PATENT DOCUMENTS

| | | | |
|---|---|---|---|
| 5,404,869 A | 4/1995 | Parkyn, Jr. et al. | 126/699 |
| 5,577,493 A | 11/1996 | Parkyn, Jr. et al. | 126/699 |
| 6,473,554 B1 | 10/2002 | Pelka et al. | 385/146 |
| 6,641,284 B2 | 11/2003 | Stopa et al. | 362/240 |
| 6,851,835 B2 | 2/2005 | Smith et al. | 362/305 |
| 6,986,593 B2 | 1/2006 | Rhoads et al. | 362/308 |
| 7,008,079 B2 | 3/2006 | Smith | 362/235 |
| 7,114,832 B2 | 10/2006 | Holder et al. | 362/308 |
| 7,172,319 B2 | 2/2007 | Holder et al. | 362/341 |
| 7,401,960 B2 * | 7/2008 | Pond et al. | 362/545 |
| 7,661,840 B1 * | 2/2010 | Eriksson | 362/230 |
| 2007/0230171 A1 * | 10/2007 | Hiratsuka | 362/235 |
| 2007/0285920 A1 * | 12/2007 | Seabrook | 362/240 |
| 2009/0168395 A1 * | 7/2009 | Mrakovich et al. | 362/84 |

* cited by examiner

*Primary Examiner* — Hargobind S Sawhney

(74) *Attorney, Agent, or Firm* — Alix, Yale & Ristas, LLP

(57) ABSTRACT

An optical system for an LED array includes a trough reflector in combination with an elongated lens. The reflector and lens include distinct regions dedicated to particular zones of light emanating from the LED array. The reflector includes lower, upper and end portions, each configured to redirect a particular zone of wide angle light from the LED array into a pre-determined warning light pattern. The lens includes central, side and end regions, each configured to redirect a particular zone of narrow angle light from the LED array into the pre-determined warning light pattern. The shape of the trough reflector and lens, as well as the relationship between the lens and reflector, are selected to provide an optical system with expanded illuminated surface area and a low profile.

11 Claims, 8 Drawing Sheets

OPTICAL SYSTEM FOR LED ARRAY

BACKGROUND

The present disclosure relates generally to warning lights for use with emergency vehicles such as police cars, fire trucks and ambulances, and more particularly to an optical system for producing integrated directional light from a plurality of LED lamps.

Within any broad category of illumination devices such as warning lights, lights designed for a particular application, e.g., aircraft warning lights, may have a very different required intensity and light pattern than a warning light designed for, e.g., an emergency vehicle such as a police car or fire truck.

The prior art contains numerous examples of alternative light sources, reflectors and lenses arranged to produce particular intensities and distributions of light suited for a particular purpose. Of primary concern to designers of lights are efficiency and accuracy. By efficiency, it is meant that lighting designers are concerned with producing the maximum amount of light per unit of energy applied and transforming that light into a useful pattern with minimal losses. The light fixture must also distribute the available light as accurately as possible in the desired pattern. Any light that is scattered or not accurately directed in the desired pattern is effectively lost by being dispersed.

Light Emitting Diodes (LEDs), while efficient producers of light in terms of light produced per unit of applied energy, continue to be limited in terms of the quantity of light produced by individual LED lamps. Advances in LED technology have resulted in commercially available LED lamps with significantly improved light output. High-output (also referred to as high brightness) LEDs are now a practical light source for use in signaling and warning illumination. Even though high-output LED lamps have significantly greater light output (luminous flux) than previous LED lamps, the total luminous flux produced by each LED lamp is still relatively small, e.g., in the range of 50 to 130 lumens, and will typically have a very wide viewing angle of 110 to 160 degrees. Thus, these newer LED lamps produce a "half globe" of light in contrast to a directed beam of light. It is typically necessary to accumulate multiple LED lamps in a compact array and externally focus their light output to produce a light source with luminous intensity sufficient for many warning and signaling applications.

LED lamps are attractive to lighting designers because the light they produce is typically of a very narrow spectral wavelength, e.g., of a single pure color, such as red, blue, green, amber, etc. LED lamps are extremely efficient producers of colored light because the particular chemical compound used in the die of the LED, when excited by electrical current, produces a monochromatic band of energy within the visible light spectrum. For example, a red LED will generate a narrow wavelength of light in the visible red spectrum, e.g., 625 nm+/−20 nm. No external color filtering is needed, significantly improving the efficiency of the light source. Further, LED lamps are directional light sources. The light produced from an LED lamp is primarily directed along an optical axis through the center of the lens of the LED lamp. However, and in particular with the more recent high-output LED lamps, a significant portion of the light is also directed out the sides of the lens of the LED lamp (the above mentioned "half globe"). If the limited light output of an LED lamp is to result in a practical signaling or illuminating device, as much of the light produced by each LED lamp must be captured and directed in the desired light pattern as possible.

Various federal and state standards apply to warning light systems for fire, ambulance and police emergency response vehicles. Although there are differences among the standards, the basic requirement is that warning light systems provide a 360° pattern of visual warning around the vehicle. The standards are typically defined in terms of color and intensity, measured from particular vantage points around the vehicle. Many illumination standards measure intensity with respect to a horizontal plane passing through the center of the warning light in its installed orientation. Such a horizontal plane bisecting the warning light is a convenient reference for describing the structures of the warning light as well as the resultant photometric pattern. For warning purposes, the most effective photometric pattern for a surface-mount warning light is a vertically collimated wide-angle beam.

Another aspect of surface-mount warning lights relates to the aesthetic appearance of the warning light. Keeping the profile (profile is the extent to which the warning light protrudes from the vehicle body) of a surface-mount warning light as low as possible allows the warning light to blend with the surface of the vehicle to create an aesthetically pleasing and aerodynamic appearance. Another aesthetic objective of warning light design is to provide a uniformly illuminated surface area with minimal "dead" areas rather than points of intense illumination surrounded by reduced intensity or dark areas.

SUMMARY

The present disclosure relates to an optical system employing a combination of optical elements which together provide an aesthetically pleasing and photometrically effective warning light illumination pattern in a low-profile surface-mount LED warning light for use with emergency vehicles. The disclosed optical system employs LUXEON® Rebel® LED lamps manufactured by Philips Lumileds, although other LED lamps are compatible with the optical system. Rebel LED lamps emit light in a hemispherical pattern surrounding an optical axis originating at the LED chip or die. The LED chip is arranged on a heat-conductive base or slug and surrounded by a lens. The disclosed optical system combines the light from a plurality of LED lamps into a wide-angle, vertically collimated beam. The disclosed optical system expands the illuminated surface area of the warning light, while minimizing the height of the warning light above the LED lamps to provide a low-profile design.

The term "vertically collimated" as used in this application means a photometric pattern in which light is redirected into a direction substantially parallel with a horizontal plane bisecting the warning light. Such a vertically collimated pattern ensures maximum intensity in the required warning illumination pattern, e.g., a horizontal plane surrounding the vehicle. The structures of the disclosed warning light are configured to permit or promote light to diverge within the horizontal plane, enhancing the angular spread of the warning illumination pattern.

The disclosure relates to an optical system for an array of LED lamps, where each lamp includes a die from which light is emitted in a hemispherical pattern surrounding an optical axis originating at the die. The LED lamps are arranged along a line to form a linear array having a length.

The optical system includes a reflector with a pair of reflecting surfaces laterally spaced from and parallel to the linear array of LED lamps. The reflecting surfaces have a lower portion defined by intersecting circular parabolic surfaces, each circular parabolic surface being centered on the optical axis of one of the LED lamps. An upper portion of the reflector is defined by a linear surface extending axially above the lower portion and laterally away from the aligned optical axes of the LED lamps.

A lens extends the length of and is positioned axially above the linear array of LED lamps and between the reflecting surfaces. The lens includes a central region intersected by the optical axes of the LED lamps and opposed side regions separated by the central region. The central region is configured to refract divergent light from the LED lamps into a direction generally parallel to a plane including the optical axes of the LED lamps. The side regions of the lens are defined by a receiving surface configured to refract light from the LED lamps into the side regions of the lens and an internal reflecting surface arranged to reflect light passing through the receiving surface into a direction generally parallel to the plane including the optical axes of the LED lamps. The lens also includes an emission surface through which the refracted and reflected light passes.

End portions of the reflector and lens are defined by rotating the sectional configuration of the reflector and lens, respectively, about an optical axis of an end lamp in the linear array. Each of the central region, side regions (of the lens), upper portions and lower portions (of the trough reflector) are arranged to redirect light from said lamps emitted at a predetermined range of angles with respect to the plane including the optical axes of the LED lamps. The predetermined ranges of angles span an arc of approximately 180° centered on and measured in a direction perpendicular to the plane including the optical axes of the LED lamps. The range of angles of light incident upon the trough reflector is separated from the plane by an angle occupied by light incident upon the lens.

DETAILED DESCRIPTION

Figure 1:
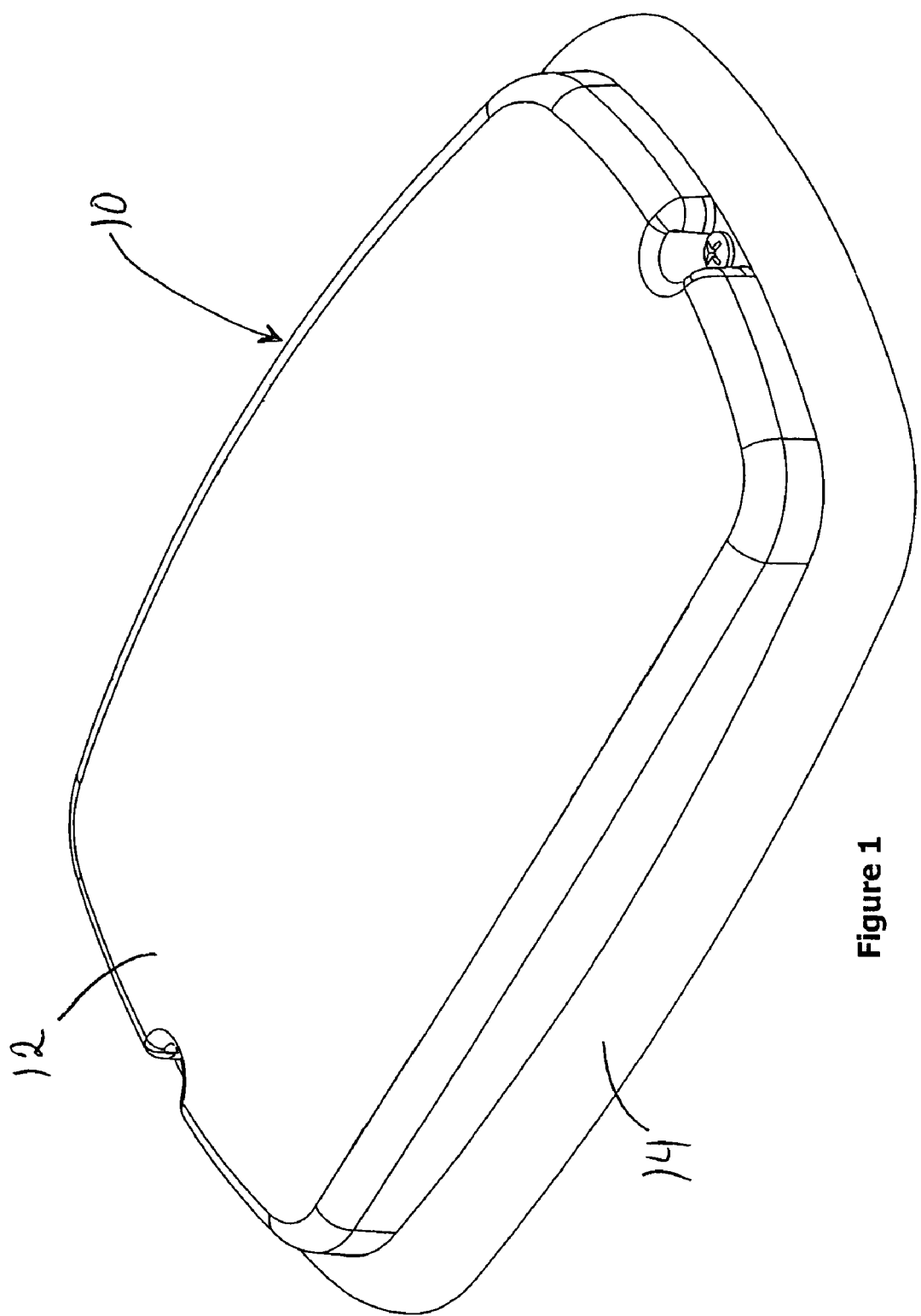
FIG. 1 is an exterior perspective view of a surface mount warning light incorporating the disclosed optical system.

An embodiment of the disclosed optical system will now be described with reference to FIGS. 1-8. The disclosed optical system is intended for use in a warning light to be installed on an emergency vehicle with the longitudinal axis of the combination parallel with the ground and the light directed away from the vehicle in a horizontal plane. The terms "vertical" and "horizontal" have their ordinary meaning and are used with reference to the intended installed orientation of the warning light. FIG. 1 is an exterior view of a representative surface mount warning light identified by the reference numeral 10. A cover lens 12 and peripheral frame 14 enclose and protect interior components of the warning light and provide a finished appearance.

Figure 2:
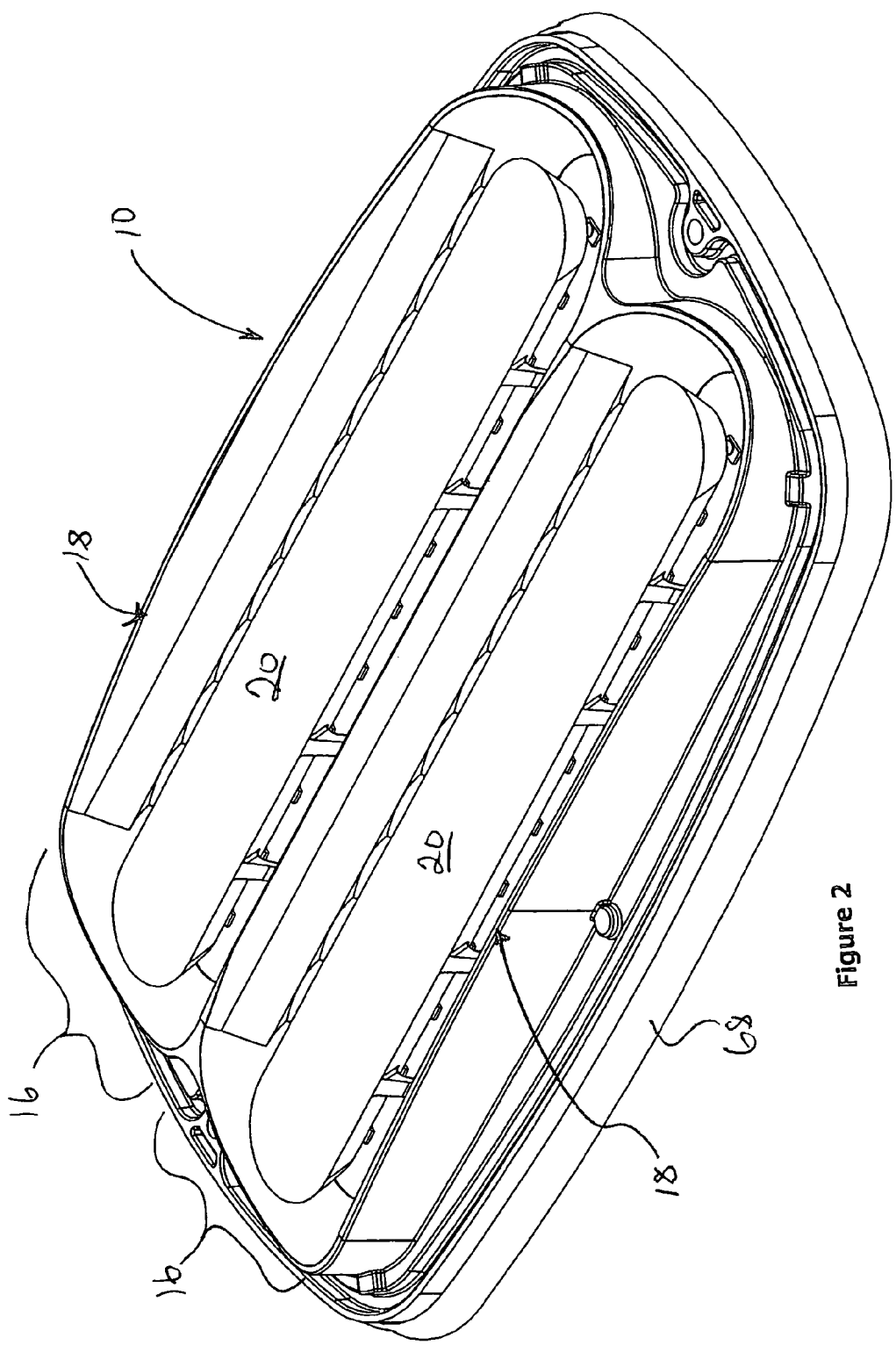
FIG. 2 is a perspective view of the warning light of FIG. 1 with the cover lens and bezel removed to show the disclosed optical system.
Figure 3:
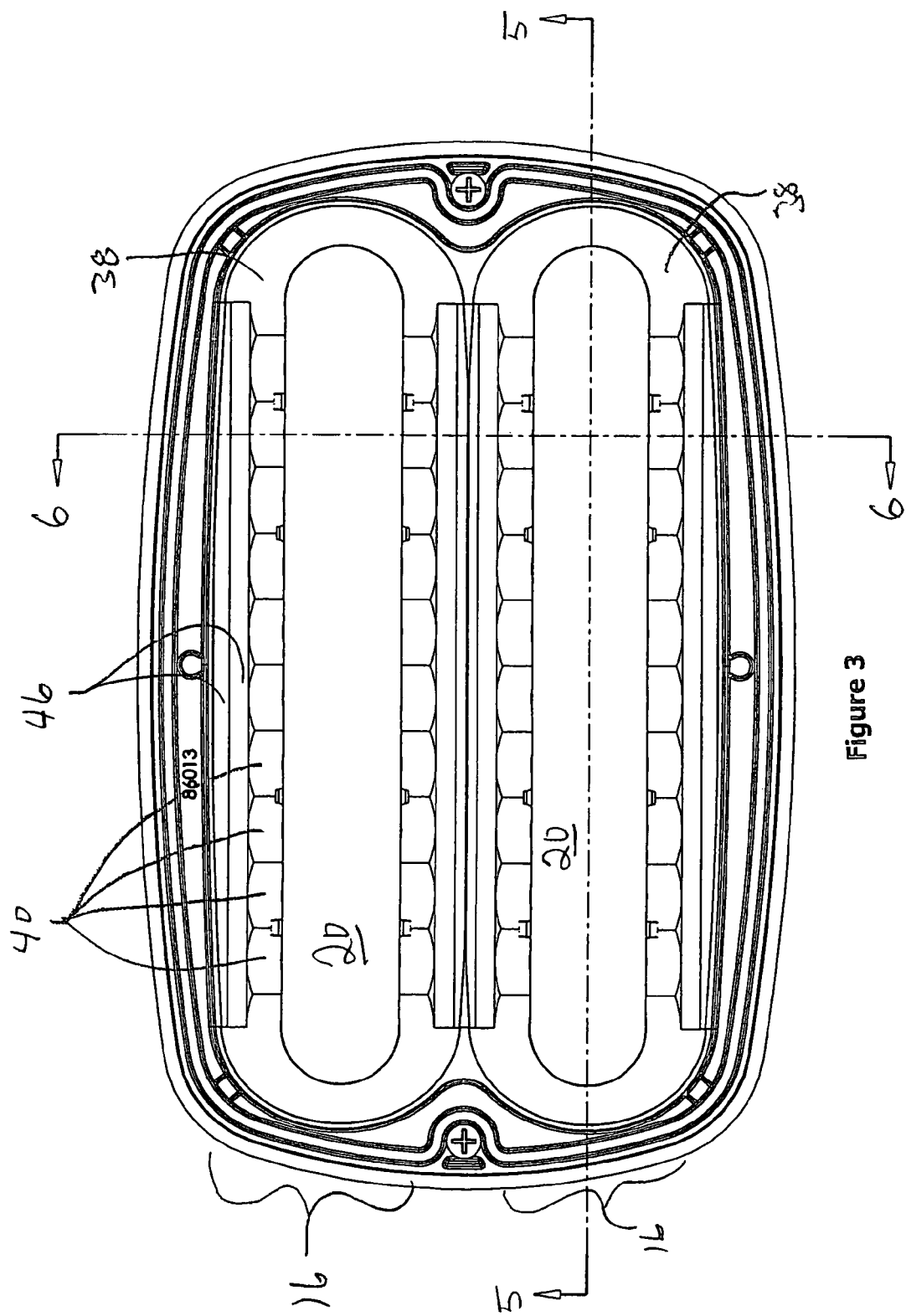
FIG. 3 is a top view of the warning light as shown in FIG. 2.

FIGS. 2 and 3 show the warning light 10 with the lens 12 and frame 14 removed to expose the optical system, which is identified with reference numeral 16. In the disclosed optical system 16, a longitudinally extending trough reflector 18 works in combination with a longitudinally extending lens 20 to provide a low-profile optical combination having an expanded illuminated surface area. The exemplary warning light 10 includes two substantially identical optical systems 16. Different regions of the reflector 18 and lens 20 are configured to each handle a selected portion of the light generated by the linear array of high brightness LED lamps 22. The lens 20 is configured and positioned to handle "narrow angle" light 24 that is not incident on the reflector 18, while the reflector 18 is constructed and arranged to handle "wide angle" light 26 emitted by the LED lamps. The terms "narrow angle" and "wide angle" as used in this specification refer to the angle at which the light is emitted from an LED lamp 22 with respect to the optical axis $A_O$ of each LED lamp 22. Narrow angle and wide angle are relative terms. As used in the context of the disclosed optical combination, "wide angle" light 26 is emitted at angles greater than about 50° with respect to the LED lamp optical axis $A_O$, and "narrow angle" light is emitted at angles less than about 50° with respect to the LED lamp optical axis $A_O$.

Figure 4:
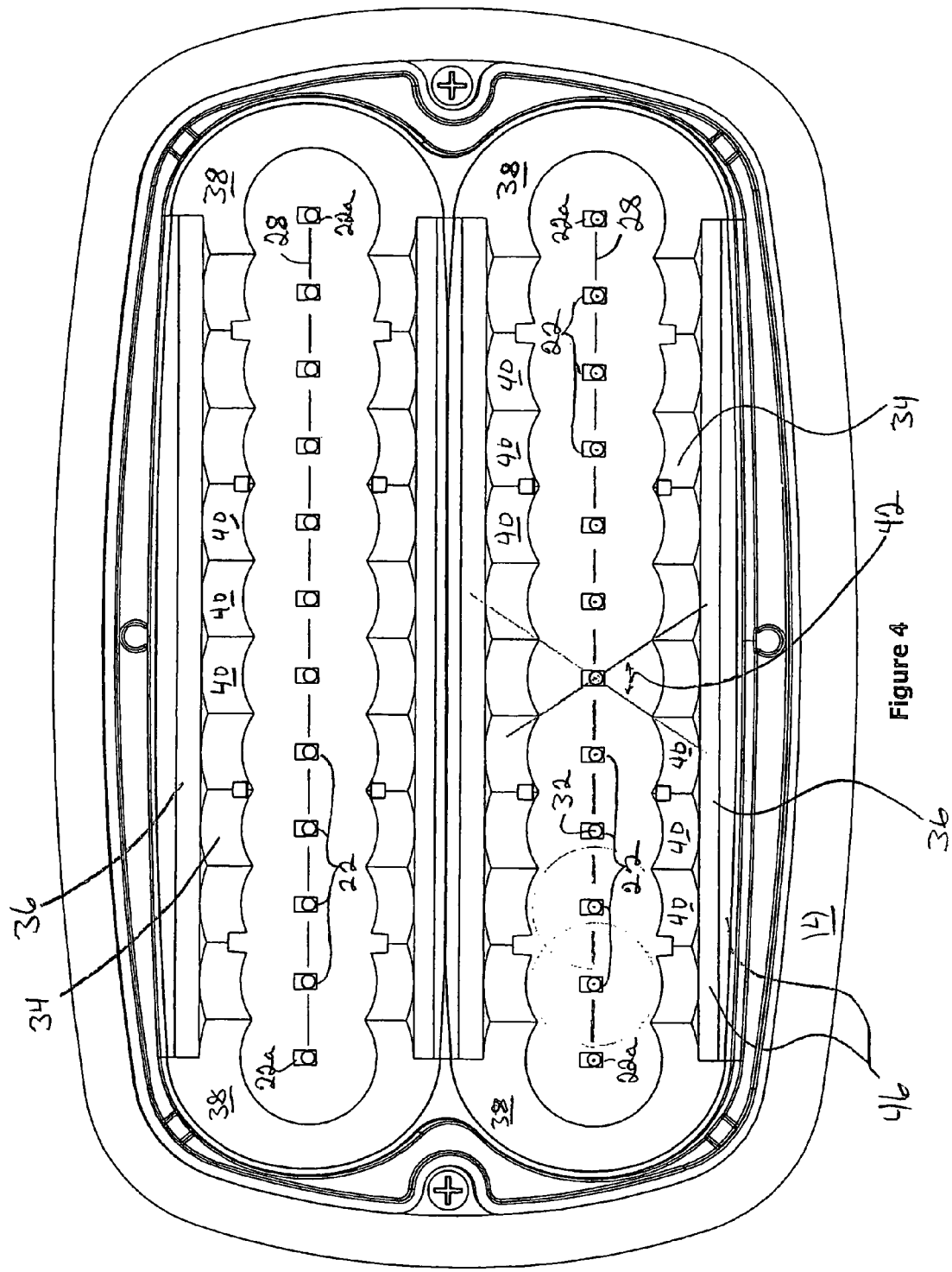
FIG. 4 is a top view of the warning light as shown in FIG. 3, with the elongated lenses removed to show the arrays of LED lamps and trough reflector configuration.
Figure 5:
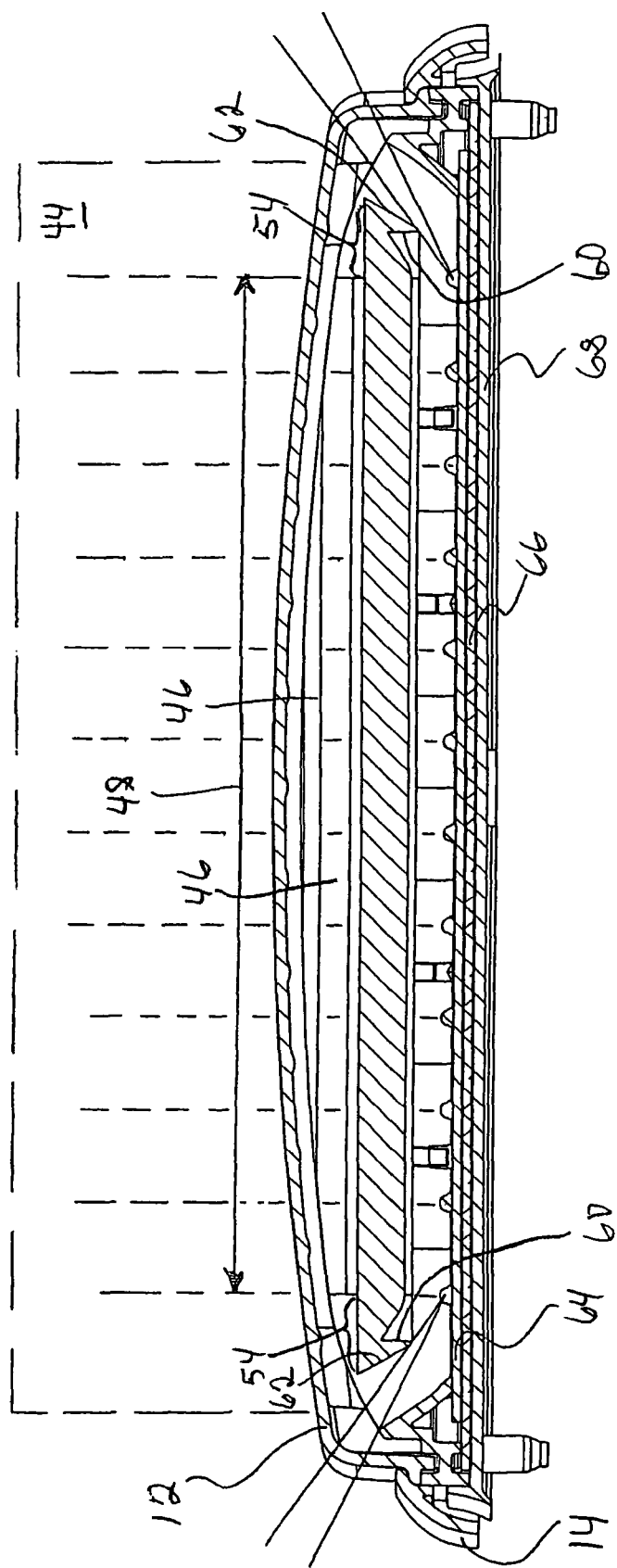
FIG. 5 is a sectional view through the warning light as shown in FIG. 3, taken along line 5-5 thereof, including the cover lens and bezel as shown in FIG. 1.
Figure 6:
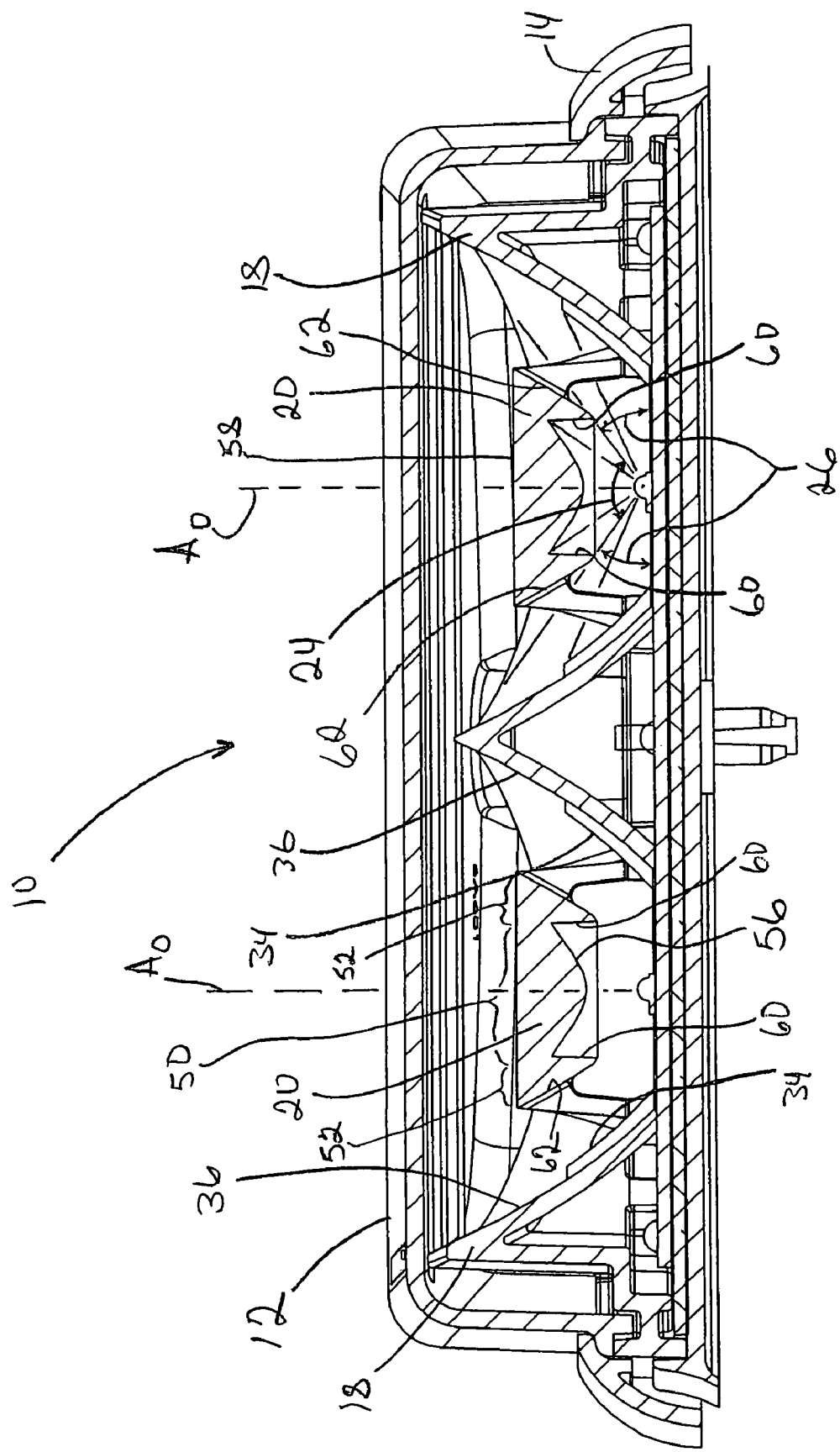
FIG. 6 is a sectional view through the warning light as shown in FIG. 3, taken along line 6-6 thereof an d including the cover lens and bezel as shown in FIG. 1.
Figure 7:
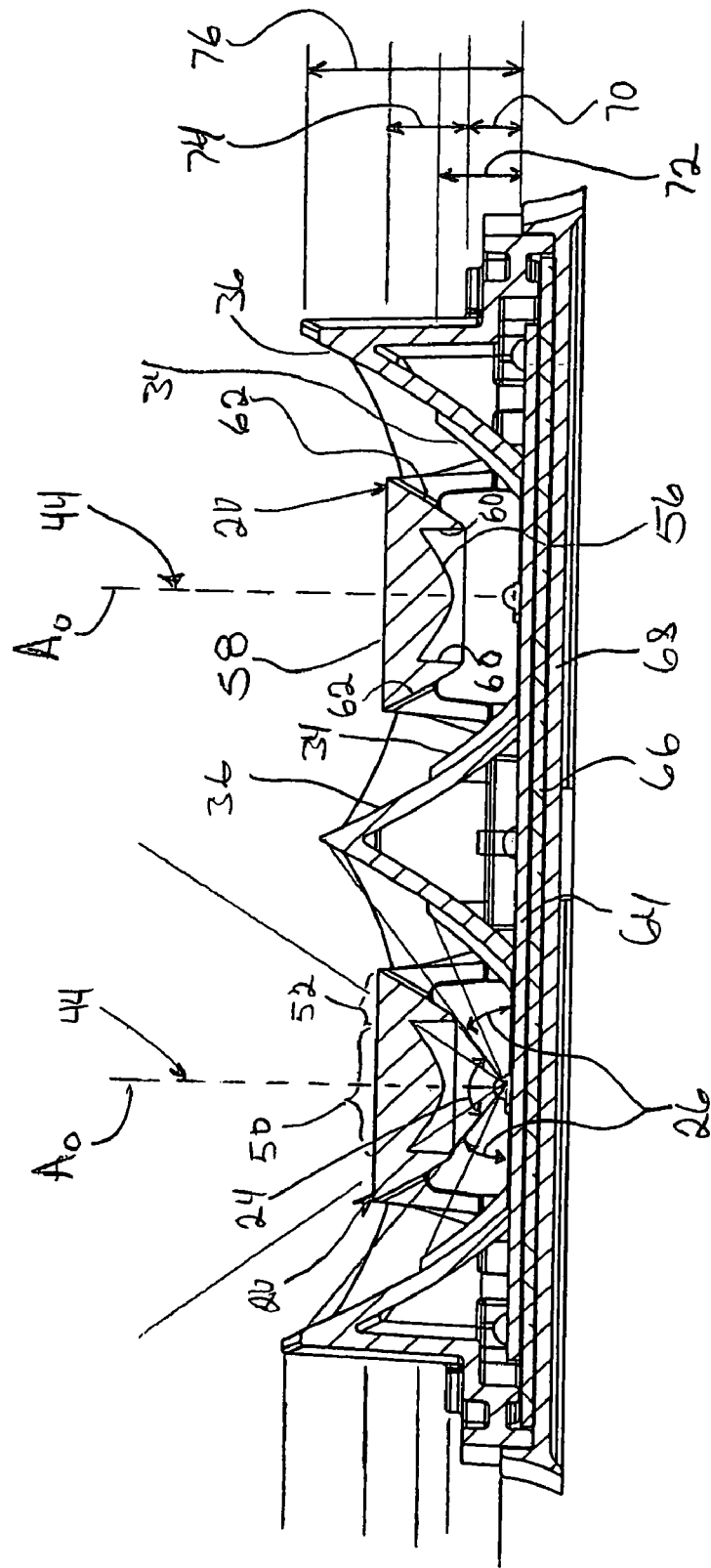
FIG. 7 is a sectional view through the warning light as shown in FIG. 3, taken along line 6-6 thereof.
Figure 8:
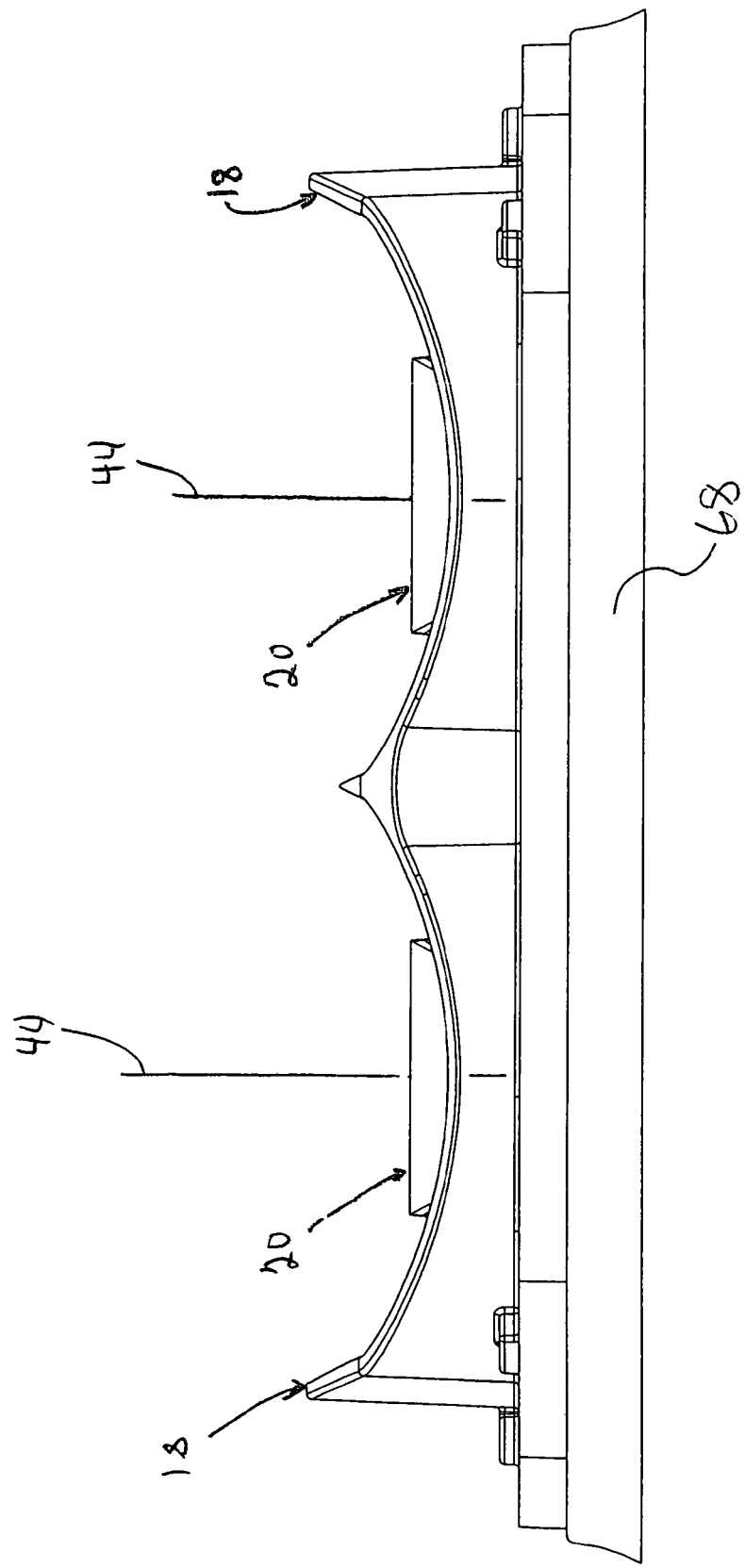
FIG. 8 is an end view of the warning light as shown in FIG. 3.

As best seen in FIGS. 6 and 7, the trough reflector 18 in the disclosed configuration is generally parabolic in cross-section, with the parabolic curve selected to enhance the lateral span of the reflector 18. In this application, "parabolic" is used to mean "resembling or similar to a parabola" and is not limited to an exact or precisely parabolic shape. The trough reflector 18 sectional configuration, as shown in FIGS. 6 and 7, is a portion of the selected parabolic curve cut off at the bottom by a horizontal plane arranged just below the focus of the parabolic curve, while the upper limit of the reflector is constrained by the height and shape of the cover lens 12 for the warning light 10, e.g., the desired profile (height above the LED lamps) of the warning light 10. In the disclosed optical configuration, the lower boundary of the trough reflector 18 defines an elongated opening surrounding a linear array 28 of LED lamps 22 mounted to a PC board 30, as shown in FIGS. 4-7. The light-emitting portions, or dies 32, of the LED lamps 22 in the linear array 28 are arranged along a line substantially coincident with a linear focal axis of the trough reflector 18.

The lower 34 portion and upper portion 36 of the longitudinal sides of the trough reflector 18 have distinct surface shapes. End portions 38 of the trough reflector 18 are defined by rotating the parabolic curve around the optical axis $A_O$ of LED lamps 22a at either end of the linear array 28. End portions 38 of the trough reflector have a substantially uniform geometric configuration spanning the height of the reflector and extending between the longitudinal sides of the trough.

The lower portion 34 of the parabolic trough 18 is positioned to reflect wide-angle light 26 emitted by the LED lamps at an angle of greater than approximately 60° relative to the optical axis $A_O$ of each LED lamp 22. The lower portion 34 of the trough reflector 18 is defined by a plurality of intersecting concave parabolic facets 40. Each concave parabolic facet 40 is based on the same parabolic curve employed to generally define the trough reflector 18, where the curve is partially rotated about the optical axis $A_O$ of an LED lamp 22 in the array 28. In an LED lamp 22 having a hemispherical "lambertian" light emission pattern, this wide angle zone of light emission is typically the weakest. Light from an LED lamp 22 between two opposed facets 40 that is incident upon the facets 40 will be vertically and horizontally collimated into a beam generally parallel with the optical axis $A_O$ of the LED lamp 22. When viewed from above as shown in FIG. 4, each facet 40 traverses an arc 42 of about 60° centered on the optical axis $A_O$ of each LED lamp 22 in the array 28. Thus, two facets 40 opposite each LED lamp 22 cover approximately 120° of the light pattern surrounding each LED lamp 22. About one third of the wide angle light incident upon the lower portion 34 of the trough reflector 18 will be vertically and horizontally collimated by the facets 40 opposite each LED lamp 22. About two thirds of the light from each LED lamp 22 incident upon the lower portion 34 of the trough reflector 18 is emitted in a direction not incident on the opposed facets 40 adjacent that LED lamp 22 and will tend to be vertically collimated (generally aligned with a horizontal plane 44 through the middle of the optical system 16), but allowed to diverge horizontally by other facets 40 making up the lower portion 34 of the trough reflector 18. In the disclosed embodiment of an optical system, the number of parabolic facets 40 in the lower portion 34 of the trough is equal to the number of LED lamps 22 in the linear array 28, although LED lamps 22 may be omitted without adversely impacting the function of the optical system. It will be apparent that this description applies to LED lamps 22 that are not those at each end of the linear array, i.e., the "end lamps" 22a.

The upper portion 36 of the trough reflector 18 is configured as a linear surface parallel with the linear array 28 of LED lamps 22 and the linear focus of the parabolic trough 18. The upper portion 36 of the trough reflector is positioned to reflect wide angle light emitted from the LED lamps 22 at angles of between approximately 50° and 60° with respect to the optical axis $A_O$ of the LED lamps 22. The upper portion 36 of the parabolic trough 18 is generally based on the same parabolic curve as the other portions of the trough 18. Generally speaking, the upper portion 36 of the parabolic trough is a portion of the selected parabolic curve projected along the linear focal axis of the optical system 16. The disclosed configuration modifies this linear parabolic surface into two convex ribs 46. The slight convex surface configuration of these ribs 46 enhances the vertical spread of the warning light emission pattern by spreading the emitted light with respect to a horizontal plane 44 bisecting the optical assembly 16. The number and configuration of the ribs 46 may be varied to adjust the vertical spread of the illumination pattern produced by the warning light 10. The upper portion 36 of the reflecting trough 18 has a length 48 substantially equal to the length of the linear array 28 of LED lamps 22. In the disclosed optical system 16, the trough upper portion 36 convex ribs 46 extend between the optical axes $A_O$ of an LED lamp 22 at each longitudinal end of the linear array, i.e., the "end lamps" 22a. As shown in FIG. 5, the upper boundary of the trough reflector 18 is limited by the shape of the cover lens 12. In the disclosed embodiment, the upper boundary of the trough reflector is a curve, although other upper boundary configurations are compatible with the disclosed optical system 16.

Each end 38 of the trough reflector 18 is a surface defined by the parabolic curve used for the intersecting facets rotated about the optical axis $A_O$ of the end lamp 22a in the linear array 28. The parabolic dish ends 38 traverse an arc of approximately 240° and are configured to collimate wide angle light from the end lamps vertically and horizontally. As shown in FIGS. 5 and 6-8, the upper boundary of this rotated parabolic section is defined by a concave curve having a low point aligned with a longitudinal axis of the optical system and the plane 44 bisecting the optical system 16. As shown in FIG. 5, the reduced axial height of the rotated parabolic surface permits some light from the end lamps 22a in the linear array 28 of LED lamps to exit the optical system 16 without being re-directed by either the trough reflector 18 or the elongated lens 20. This light emitted from the end lamps 22a of the optical configuration enhances the wide-angle illumination pattern of the warning light 10. The open trough, reduced height end portions and linear configuration of the upper portion 36 of the trough allow light from the LED lamps to combine, overlap and spread horizontally to provide a wide-angle illumination pattern, while light from the LED lamps is vertically collimated to reinforce the desired illumination pattern.

The center of the disclosed optical system 16 is occupied by a longitudinally extended lens 20. As shown in FIGS. 5-7 the lens 20 is positioned and configured to intercept most of the light emitted from the linear array 28 of LED lamps 22 that is not incident upon the trough reflector 18. A notable exception is wide-angle light emitted at the ends of each trough reflector 18 as discussed above. The lens 20 can be described with respect to three regions: a central region 50, opposed side regions 52 and the longitudinal ends 54. The central region 50 of the lens is configured to refract narrow-angle light 24 emitted from the LED lamps 22 at angles of less than about 35° from the optical axis $A_O$ of the LED lamps into a beam that is collimated in one direction (vertically), but allowed to diverge in a second direction (horizontally) perpendicular to the first direction. The lower and upper surfaces 56, 58 of the central region of the lens 20 cooperate to refract light from its emitted direction into a direction parallel with a first (horizontal) plane bisecting the warning light, but allow the light to retain its emitted and divergent horizontal direction. This is a "vertically collimated, wide angle beam" when the disclosed optical system 16 is installed with the longitudinal axis of the optical configuration parallel with the ground. As shown in FIGS. 5-7, the central region 50 of the lens 20 has a substantially constant cross-sectional configuration including a convex, curved bottom surface 56 and substantially planar upper surface 58. Alternative lens central region configurations may include convex upper and lower surface configurations as will occur to those skilled in the art.

The elongated lens 20 includes side regions 52 having a substantially planar light entry surface 60, a cooperating internal reflecting surface 62 and a light emission surface coincident with the central region upper surface 58. As shown in FIGS. 6 and 7, the light entry surface 60 is arranged to receive and refract light emitted from the LED lamps 22 at an angle of between about 35° and about 50° with respect to the optical axis $A_O$ of the LED lamps. Once light is received into the side regions 52 of the elongated lens 20, the internal reflecting surface 62 is arranged to reflect that light into a direction substantially parallel with a horizontal plane 44 bisecting the optical system 16. In the disclosed optical system 16, the side regions 52 of the lens also have a constant sectional configuration along the length of the lens 20. The longitudinal ends 54 of the lens 20 are defined by the sectional configuration of the lens 20 rotated about the optical axis $A_O$ of the LED lamp at each end of the linear array, i.e., the "end lamps" 22a. The semicircular configuration of the internal reflecting surface 62 at each end of the lens 20 serves to vertically and horizontally collimate light incident upon it.

The term "collimate" as used in this specification is intended to mean "substantially collimated or generally parallel with the referenced direction, plane or axis." Those skilled in the art will appreciate that various factors will affect the shape of an illumination pattern produced by an optical system. These factors include the type of LED, the size, shape and position of the area of light emission in the LED, the presence, shape and quality of the lens on the LED, as well as the shape, position and surface quality of the optical elements. In this specification, collimated light may be aligned with a plane, e.g., collimated with respect to a first orientation and allowed to diverge with respect to a second orientation perpendicular to the first orientation. When discussing the disclosed optical system 16, light leaving the LED lamps 22 in directions diverging from the optical axis $A_O$ of the LED lamps in a vertical plane is redirected to a path generally parallel with a horizontal plane 44 including the optical axes $A_O$ of the LED lamps 22, while light leaving the LED lamps 44 is allowed to diverge in a horizontal direction to form a "vertically collimated, wide-angle beam."

The lens 20 in the disclosed optical system 16 is elevated with respect to the LED lamps 22 and laterally expanded with respect to a longitudinal axis of the optical system 16. With reference to FIG. 7, the lens 20 is mounted within the trough reflector 18. The emission (top) surface 58 of the lens is above the top of the lower portion of the trough reflector 18 but below the upper terminus of the trough. In the disclosed optical system 16, the lens 20 is mounted a distance 70 above the focus of the trough reflector 18, where the distance 70 is greater than one half the height 72 of the facets 40 making up the lower portion 34 of the trough 18. The lens 20 is positioned so that the vertical height 74 of the lens 20, measured in a direction parallel with the optical axis $A_O$ of the LED lamps 22, is positioned to span the transition from the lower portion 34 to the upper portion 36 of the trough reflector 18. The height of the lower portion 72 is less than about one half of the height 76 of the trough reflector 18. The elevated position and expanded width of the lens 20 cooperate with the width and reduced height of the trough reflector 18 to minimize the overall height of the optical system while maximizing the LED light which is gathered and organized into the desired vertically collimated wide-angle beam.

It will be noted that the LED lamps 22 are arranged in a line such that the optical axes $A_O$ of the LED lamps in the linear array 28 are included in a plane 44 bisecting the optical combination as shown in FIG. 5. With respect to this plane 44, each portion of the optical system has a structure dedicated to a predetermined portion of the light from the linear array of LED lamps. For example, light having an emission angle of greater than approximately 35° with respect to the optical axis of the LED cannot effectively be refracted into the central region 50 of the elongated lens 20 because its angle of incidence with respect to the central region lower surface 56 exceeds the critical angle. The light entry surface 60 of the side regions 52 of the elongated lens are arranged to reduce the angle of incidence of this light to well below the critical angle to ensure the light is received into the lens, where the internal reflecting surface 62 redirects the light into the intended warning illumination pattern.

The disclosed embodiment of a warning light 10 includes two of the disclosed optical systems 16. The optical systems 16 are parallel to each other and configured to occupy substantially all the surface area of the disclosed warning light 10 to provide a large illuminated surface area. As shown in FIGS. 5-7, the linear arrays 28 of LED lamps 22 are mounted to a PC board 64 which includes thermal features beneath each LED lamp 22 to conduct heat away from the LED lamps 22 as is known in the art. The PC board 64 is secured to a metal heat sink plate 66. The thermal features of each LED lamp 22, thermally conductive features of the PC board 64 and metal heat sink plate 66 provide a thermal pathway to take heat away from the LED lamps 22. In a typical installation, a gasket 68 is placed between the exterior surface of a vehicle (not shown) and the base plate 66 of the warning light 10. Screws secure the warning light 10 and gasket 68 to the vehicle. A cover lens 12 and the frame 14 enclose the front side of the warning light 10 and create a finished appearance with respect to the vehicle. It will be noted that the upper terminus of the reflecting trough at the extreme top and bottom of the warning light is configured to run parallel with the arcuate shape of the inside surface of the cover lens as shown in FIG. 5. FIG. 5 also shows that the semicircular parabolic end portions 38 of each trough 16 are shortened allowing light end lamps 22a in the linear array 28 to exit the optical system 16 in a direction enhancing the wide-angle warning light illumination pattern.

It will be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the disclosure includes other combinations of fewer, more or different elements, even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, and what can be obviously substituted.

What is claimed is:

1. An optical system for an array of LED lamps, each said lamp comprising a die from which light is emitted in a hemispherical pattern surrounding an optical axis originating at said die, said lamps arranged along a line extending through said dies to form a linear array having a length, said optical system comprising:

a reflector including a pair of reflecting surfaces laterally spaced from and parallel to said linear array, each said reflecting surface having a lower portion defined by intersecting circular parabolic surfaces, each said circular parabolic surface centered on the optical axis of one of said lamps and an upper portion defined by a linear surface extending axially above said lower portion and laterally away from the optical axes of said lamps; and a lens extending the length of said linear array and positioned axially above said linear array and between said reflecting surfaces, said lens having a central region intersected by the optical axes of said lamps and opposed side regions separated by said central region, said central region configured to refract light from said lamps into a direction generally parallel to a first plane including the optical axes of said lamps, said outer side regions each defined by a receiving surface configured to refract light from said lamps into said lens, an internal reflecting surface arranged to reflect light refracted by said receiving surface into said direction generally parallel to said first plane and an emission surface through which said reflected light passes;

wherein each of said central region, side regions, upper portions and lower portions are arranged to redirect light from said lamps emitted at a predetermined range of angles with respect to said first plane, said predetermined ranges traversing an arc of approximately 180° in a direction perpendicular to and centered on said first plane, the predetermined range of angles of light redirected by said upper portions and lower portions of said reflector being separated from said first plane by an angle traversed by the predetermined range of angles of light passing through said central and side regions of said lens.

2. The light assembly of claim 1, wherein the predetermined ranges of angles do not overlap.

3. The light assembly of claim 1, wherein the predetermined range for said upper and lower portions is between approximately 90° and approximately 50° on either side of said first plane.

4. The light assembly of claim 1, wherein said reflector includes an end portion defined by rotating the circular parabolic surface adjacent an end lamp at one end of the linear array around the optical axis of said end lamp, said end portion extending between said pair of reflecting surfaces.

5. The light assembly of claim 1, wherein said reflector includes end portions defined by rotating the circular parabolic surface adjacent an end lamp at both ends of the array around the optical axis of each said end lamp, said end portions extending between opposed ends of said pair of reflecting surfaces.

6. The light assembly of claim 1, wherein at least one of said upper portions includes a non-linear upper boundary.

7. The light assembly of claim 5, wherein said end portions have an axial height defined by a curve, said axial height being smallest where said end portions intersect said first plane.

8. The light assembly of claim 1, wherein said linear array includes end lamps at each end of the array and the intersecting circular parabolic surfaces adjacent each lamp in the array except an end lamp traverse an arc of less than 90°.

9. The light assembly of claim 1, wherein said lower portions have an axial height that is less than half a maximum axial height of said reflecting surfaces.

10. The light assembly of claim 1, wherein said lens has a substantially constant sectional configuration between the optical axis of an end lamp at each end of said linear array.

11. The light assembly of claim 10, wherein said lens includes a lens end portion defined by rotating the sectional configuration of said lens approximately 180° about the optical axis of at least one of said end lamps to form a semicircular receiving surface and a semicircular internal reflecting surface extending between laterally opposed ends of said receiving and internal reflecting surfaces, respectively.

* * * * *